United States Patent
Usui et al.

(10) Patent No.: US 7,298,335 B2
(45) Date of Patent: Nov. 20, 2007

(54) PORTABLE INFORMATION TERMINAL WITH COMMUNICATION CAPABILITIES

(75) Inventors: Hideyuki Usui, Chigasaki (JP); Hiroaki Agata, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/165,909

(22) Filed: Jun. 24, 2005

(65) Prior Publication Data

US 2005/0285804 A1    Dec. 29, 2005

(30) Foreign Application Priority Data

Jun. 24, 2004    (JP)    ............ 2004-186810

(51) Int. Cl.
  *H01Q 1/24* (2006.01)
  *H01Q 1/38* (2006.01)
  *G06F 1/16* (2006.01)

(52) U.S. Cl. ............... 343/702; 343/700 MS; 361/681

(58) Field of Classification Search .......... 343/702, 343/700 MS, 830; 361/681
See application file for complete search history.

(56) References Cited

U.S. PATENT DOCUMENTS 6,654,231 B2 * 11/2003 Teshima ............ 361/681
6,804,110 B2 * 10/2004 Amemiya et al. ...... 361/683

FOREIGN PATENT DOCUMENTS

| JP | 08-078931 | 3/1996 |
| JP | 08-256009 | 10/1996 |
| JP | 11-355033 | 12/1999 |
| JP | 2003-283232 | 10/2003 |

* cited by examiner

*Primary Examiner*—Shih-Chao Chen
(74) *Attorney, Agent, or Firm*—Sawyer Law Group LLP

(57) ABSTRACT

A portable information terminal with communication capabilities according to the present invention comprises a conductive housing, a display, and a planar antenna. The display is attached to the inside of the housing. The planar antenna is attached to the outside of the housing.

12 Claims, 3 Drawing Sheets

PORTABLE INFORMATION TERMINAL WITH COMMUNICATION CAPABILITIES

FIELD OF THE INVENTION

The present invention relates generally to a portable information terminal with communication capabilities, and more specifically, to a portable information terminal comprising a conductive housing and a built-in antenna.

BACKGROUND OF THE INVENTION

Some recent notebook type personal computers have a built-in antenna for a wireless local area network (WLAN) or Bluetooth (registered trade mark). A planar inverted F antenna (sometimes called an "F type antenna") suitable for transmitting and receiving high frequencies is used as this antenna and embedded, for example, at the top of a rear cover or at the top of both sides of the rear cover.

Many of today's rear covers are made of a conductive material to prevent electromagnetic radiation generated within the personal computers from leaking out. In order to allow an inverted-F antenna to transmit a radio wave to the outside and receive a radio wave from the outside, an opening is provided in a rear cover in the position where the inverted-F antenna is embedded and the opening is covered with a resin cap.

The antenna requires a ground. However, the conventional structure as described above does not allow a large ground area to be provided. Consequently, such conventional antennas have a problem that they tend to be affected by the conductive material surrounding the antenna and therefore do not provide stable transmission and reception.

Accordingly, what is needed is a system and method for overcoming the above-identified problems. The present invention addresses such a need.

SUMMARY OF THE INVENTION

A portable information terminal with communication capabilities according to the present invention comprises a conductive housing, a display, and a planar antenna. The display is attached to the inside of the housing. The planar antenna is attached to the outside of the housing.

DETAILED DESCRIPTION

Figure 1:
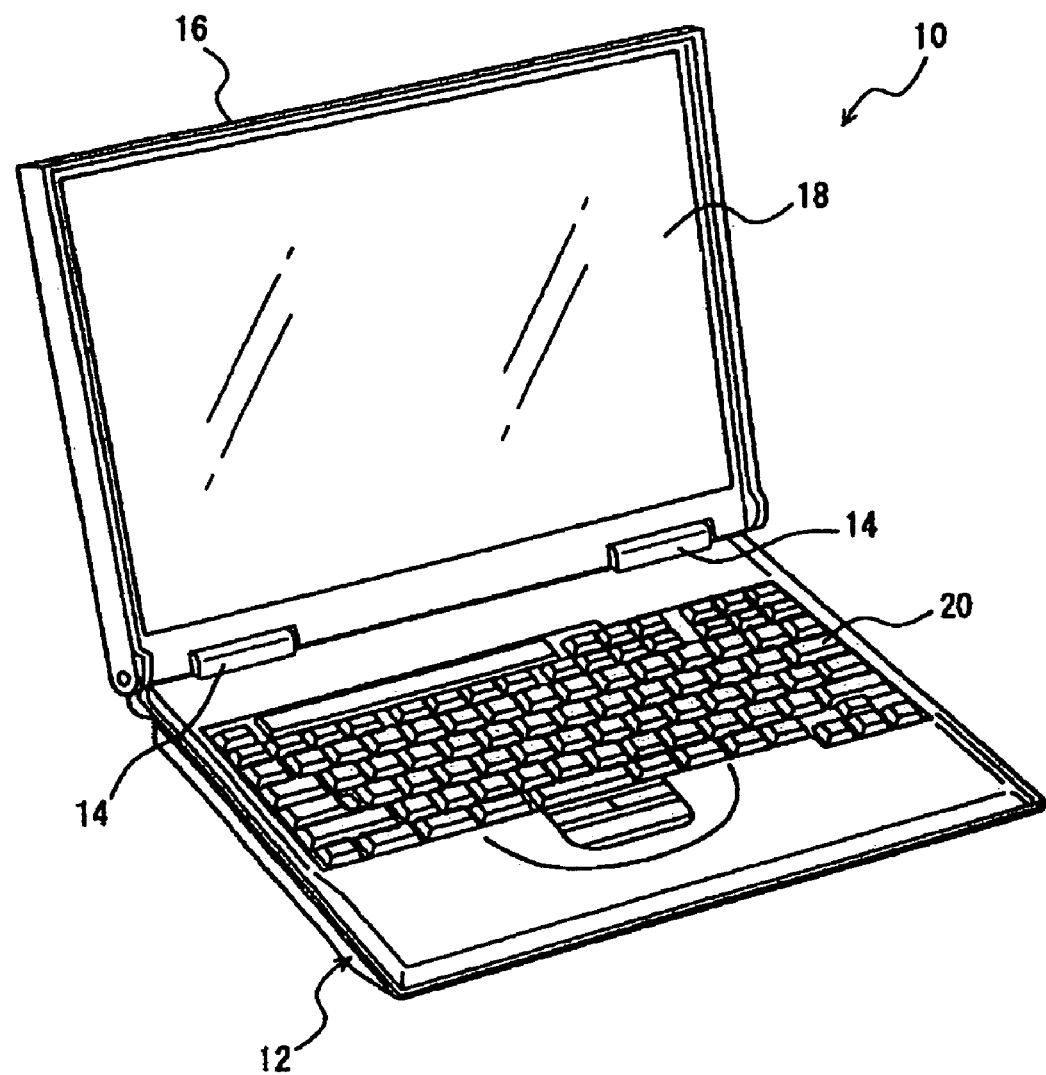
FIG. 1 is a perspective view showing the external configuration of a notebook personal computer according to an embodiment of the present invention.

[Description of Symbols]
10 . . . Notebook type personal computer
12 . . . PC main body
16 . . . Rear cover
22 . . . Hinge
24 . . . Concave
26 . . . Planar antenna
28, 30, 32 . . . Inverted F antennas
34 . . . Ground portion
36, 38, 40 . . . Resonators
42, 44, 46 . . . Notches
50, 52, 54 . . . Through-holes
56, 58, 60 . . . Coaxial cables
62 . . . Decorative laminate The present invention relates generally to a portable information terminal with communication capabilities, and more specifically, to a portable information terminal comprising a conductive housing and a built-in antenna. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

An object of the present invention is to provide a portable information terminal having a built-in antenna capable of providing stable transmission and reception even if its housing is electrically conductive.

A portable information terminal with communication capabilities according to the present invention comprises a conductive housing, a display, and a planar antenna. The display is attached to the inside of the housing. The planar antenna is attached to the outside of the housing. The term "portable information terminal" as used herein refers to a notebook type personal computer, a PDA (Personal Digital Assistance), a cellular phone (PHS (Personal Handyphone System)), or the like. For the notebook type personal computer, the term "housing" as used herein corresponds to a rear cover attached to the notebook type personal computer main body so as to be freely opened and closed.

The portable information terminal employs the conductive housing in order to block electromagnetic waves generated inside the terminal. However, since the planar antenna is attached to the outside of the housing, the terminal is unlikely to be affected by a display attached to the inside of the housing. As a result, stable transmissions and receptions can be carried out.

Preferably, the housing has a concave formed over a predetermined area outside the housing. The planar antenna is attached in the concave. The portable information terminal further comprises a dielectric decorative laminate. The decorative laminate is attached so as to cover the planar antenna.

In this case, the planar antenna is attached in the concave of the housing and is further covered with the decorative plate. Accordingly, the planar antenna is formed integrally with the housing. This simplifies the external configuration of the terminal. Moreover, the decorative plate is dielectric, so that radio waves transmitted and received by the planar antenna are not blocked by the decorative plate.

Moreover, the planar antenna preferably has a resonator. The housing has a through-hole formed at a position corresponding to the resonator of the planar antenna. The portable information terminal further comprises a cable connected to the planar antenna and passing through the through-hole.

In this case, the through-hole is formed at the position corresponding to the resonator of the planar antenna. Consequently, the vibration of the resonator is not prevented. Moreover, the cable connected to the planar antenna passes through the through-hole. This simplifies the wiring structure of the terminal.

Preferably, the planar antenna is in electric contact with the housing.

In this case, the planar antenna has a larger ground area and can thus carry out more stable transmissions and receptions.

Moreover, the housing is preferably molded of carbon fiber reinforced plastics. The planar antenna is in contact with carbon fibers exposed from a surface of the housing.

In this case, it is possible to ensure that the planar antenna and the housing are electrically contacted with each other.

An embodiment of the present invention will be described below in detail with reference to the drawings. The same or corresponding parts will be denoted by the same reference numerals, and their descriptions will not be repeated.

With reference to FIG. 1, a notebook type personal computer 10 comprises a main body (hereinafter referred to as a "PC main body") 12, a rear cover 16 attached to the PC main body 12 via hinges 14 so as to be freely opened and closed, and a liquid crystal display (LCD) 18 attached to the inside of the rear cover 16.

A keyboard 20 and the like are arranged on a top surface of the PC main body 12. The PC main body 12 contains a printed circuit board on which a CPU (Central Processing Unit), a memory, and the like are mounted, a hard disk drive, a flexible disk drive, a CD-ROM (Compact Disk-Read Only Memory) drive, and the like.

The rear cover 16 is formed of carbon-fiber reinforced plastics (CFRP) so as not to allow the leakage of electromagnetic waves generated in the PC main body 12 or the LCD 18.

Figure 2:
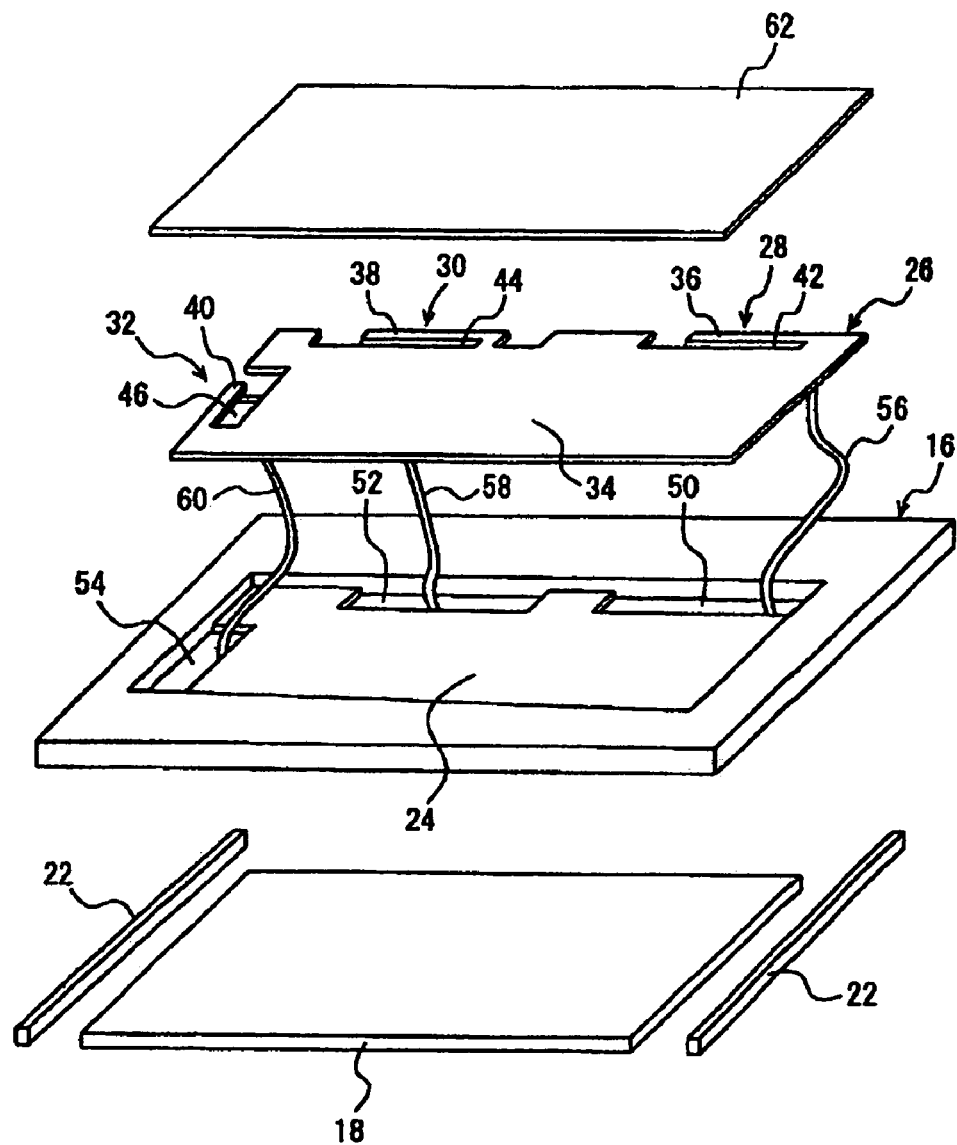
FIG. 2 is an exploded perspective view showing the configuration of a rear cover of the notebook personal computer shown in FIG. 1.

With reference to FIG. 2, the LCD 18 is installed inside the rear cover 16 using fixture such as hinges 22. On the other hand, a rectangular concave 24 is formed over a predetermined area outside the rear cover 16. The predetermined area occupies the greater part of, specifically at least half of, preferably 80% of a main surface of the rear cover 16.

A planar antenna 26 one size smaller than the concave 24 in the rear cover 16 is installed in the concave 24 parallel to the LCD 18. The planar antenna 26 is formed of metal such as copper, nickel, a copper-nickel alloy, or phosphor bronze, or their plating.

The planar antenna 26 has two WLAN inverted F antennas 28 and 30 on its long side and a Bluetooth inverted F antenna 32 on its short side. The inverted F antennas 28, 30, and 32 have resonators 36, 38, and 40, respectively, extending from a ground portion 34 like a key and notches 42, 44, and 46, respectively, formed between the resonators 36, 38, and 40 and the ground portion 34. The ground portion 34, which is common to the three inverted F antennas 28, 30, and 32, is sufficiently large compared to the resonators 36, 38, and 40. As shown in the embodiment of FIG. 2, the ground portion 34 has almost the same size as that of the concave 24.

The planar antenna 26 thus has the WLAN inverted F antennas 28 and 30 and the Bluetooth inverted F antenna 32. Consequently, the notebook type personal computer 10 can carry out transmissions and receptions using either system. Moreover, since the planar antenna 26 has the two WLAN inverted F antennas 28 and 30, a diversity system can be realized.

Figure 3:
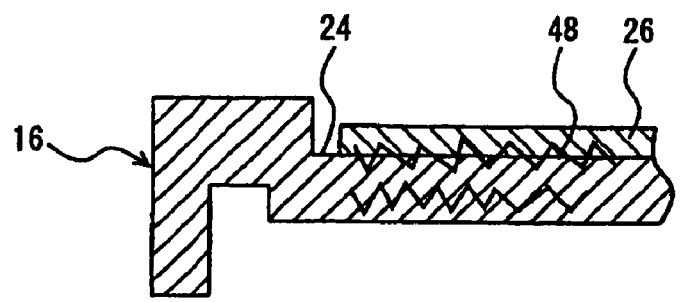
FIG. 3 is a partly sectional view of the rear cover and a planar antenna, which are shown in FIG. 2.

With reference to FIG. 3, the planar antenna 26 is in electric surface contact with the rear cover 16. Specifically, as exaggeratedly shown in FIG. 3, carbon fibers 48, a filler for CFRP, are exposed from a surface of the rear cover 16. The carbon fibers 48 are in contact with the planar antenna 26 at many points. To realize such an electric contact, insertion molding is carried out when the rear cover 16 is formed of CFRP; the planar antenna 26 is inserted into the CFRP and molded integrally with it. Alternatively, compression molding may be used to harden CFRP thermally melted, together with the planar antenna 26.

With reference to FIG. 2 again, in the concave 24 of the rear cover 16, rectangular through-holes 50, 52, and 54 are formed at positions corresponding to the inverted F antennas 28, 30, and 32 so as not to prevent the vibration of the resonators 36, 38, and 40. As shown in the embodiment of FIG. 2, the rectangular through-holes 50, 52, and 54 are formed at positions directly underneath corresponding resonators 36, 38, and 40.

Figure 4:
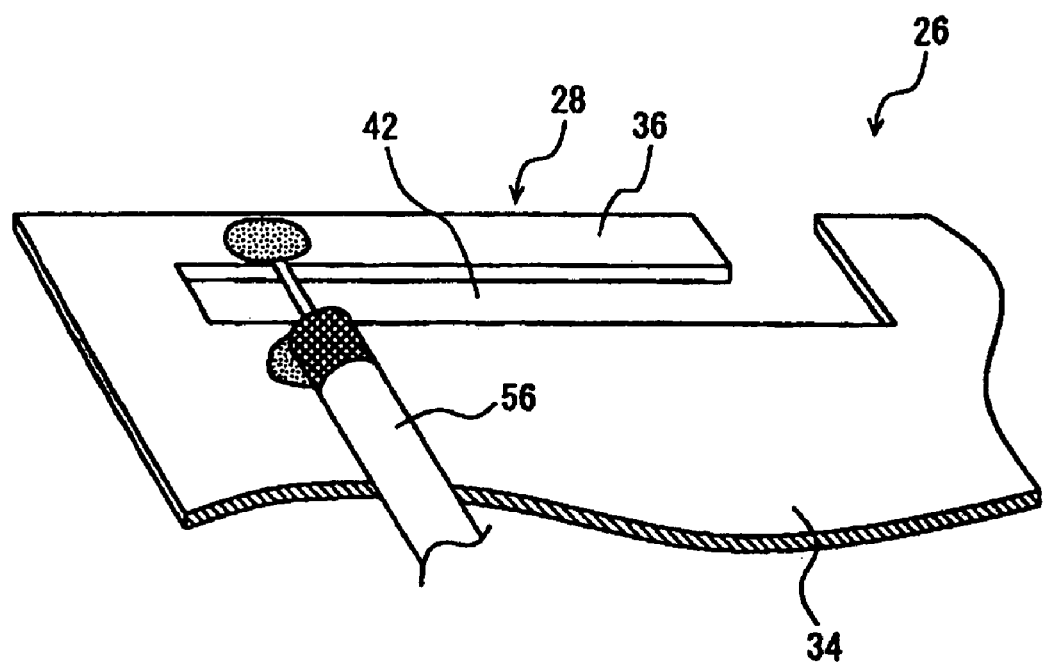
FIG. 4 is a perspective view showing a structure in which coaxial cables are attached to the planar antenna shown in FIG. 2.

With reference to FIG. 4, a coaxial cable 56 is connected to the resonator 36 and ground portion 34 of the inverted F antenna 28 by soldering. The coaxial cable 56 is connected to a transmission and reception circuit (not shown) in the PC main body 12 through the through-hole 50 as shown in FIG. 2. Coaxial cables 58 and 60 are similarly connected to the inverted F antennas 30 and 32, respectively. The coaxial cables 58 and 60 are connected to the transmission and reception circuit in the PC main body 12 through the through-holes 52 and 54.

The coaxial cables 56, 58, and 60 are thus passed through the through-holes 50, 52, and 54, respectively, formed so as not to prevent the vibration of the resonators 36, 38, and 40. This simplifies the wiring structure.

Finally, an adhesive decorative laminate 62 is fitted into and stuck to the concave 24 of the rear cover 16 so as to cover the planar antenna 26. In the embodiment shown in FIG. 2, the decorative laminate is flat. The decorative laminate 62 is a rectangle having almost the same size as that of the concave 24. The decorative laminate 62 is formed of a dielectric such as resin. Accordingly, the planar antenna 26 is formed integrally with the rear cover 16, thus simplifying the external configuration. Moreover, radio waves transmitted and received by the planar antenna 26 are not blocked by the decorative plate 62.

As described above, according to the embodiment of the present invention, the rear cover 16 is formed of the CFRP in order to block electromagnetic waves generated in the PC main body 12 or the LCD 18. However, the planar antenna 26 is attached to the outside of the rear cover 16 to ensure transmissions and receptions to and from external equipment. Further, the planar antenna 26 has the sufficiently large ground portion 34 and is in electric contact with the conductive rear cover 16. Consequently, the planar antenna 26 is unlikely to be affected by the LCD 18, the hinges 22, or the like. This enables very stable transmissions and receptions. Moreover, the planar antenna 26 is attached to the outside of the rear cover 16. This makes it possible to equally design any forms of notebook type personal computers.

In the above embodiment, the rear cover 16 is formed of the CFRP. Alternatively, the rear cover 16 may be formed of a conductive material such as aluminum or steel. Further, the concave 24, the planar antenna 26, and the decorative laminate 62 need not be rectangular but may be square, circular, elliptical, trapezoidal, or parallelogrammatic. The shapes of these components are not limited. Furthermore, slot antennas having elongated rectangular holes may be used in place of the inverted F antennas 28, 30, and 32. The type of the planar antenna is not limited. Moreover, a plasma display or the like may be used in place of the LCD 18.

The present invention is applicable not only to the notebook type personal computer but also to a PDA, a cellular phone, and the like. For a PDA or a cellular phone in which the LCD is integrated with the main body, the planar antenna may be attached to the outside of a conductive housing that accommodates the main body and the LCD. For a PDA or a cellular phone in which the LCD is attached to the main body so as to be freely opened or closed, the planar antenna may be attached to the outside of a conductive rear cover (housing) that accommodates the LCD.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A portable information terminal with communication capabilities, the portable information terminal comprising:
   an electrically conductive housing, the electrically conductive housing having a concave formed over a greater part of a main surface of the electrically conductive housing;
   a display attached inside of the electrically conductive housing; and
   a planar antenna smaller than the concave formed over the greater part of the main surface of the electrically conductive housing, the planar antenna having a resonator and being installed in the concave of the electrically conductive housing,
   wherein the electrically conductive housing includes a through-hole formed directly underneath the resonator of the planar antenna so as to not prevent vibration of the resonator.

2. The portable information terminal according to claim 1, further comprising a dielectric decorative laminate fitted into the concave of the electrically conductive housing so as to cover the planar antenna in the concave of the electrically conductive housing.

3. The portable information terminal according to claim 2, further comprising a cable connected to the planar antenna and passing through the through-hole of the electrically conductive housing.

4. The portable information terminal according to claim 2, wherein the planar antenna is installed in the concave of the electrically conductive housing parallel to the display.

5. The portable information terminal according to claim 4, wherein the planar antenna includes a plurality of WLAN inverted F antennas operable to carry out diversity transmission and diversity reception.

6. The portable information terminal according to claim 5, wherein the planar antenna further includes a Bluetooth inverted F antenna.

7. The portable information terminal according to claim 6, wherein the planar antenna is in electric contact with the electrically conductive housing.

8. The portable information terminal according to claim 7, wherein the decorative laminate is flat.

9. The portable information terminal according to claim 7, wherein:
   the electrically conductive housing is molded of carbon fiber reinforced plastics, and
   the planar antenna is in contact with carbon fibers of the carbon fiber reinforced plastics exposed from a surface of the electrically conductive housing.

10. The portable information terminal according to claim 1, wherein the portable information terminal is one of a personal computer, a personal digital assistant (PDA), of a cellular phone.

11. The portable information terminal according to claim 6, wherein the planar antenna has a ground portion common to each of the plurality of WLAN inverted F antennas and the Bluetooth inverted F antenna.

12. The portable information terminal according to claim 11, wherein the ground portion of the planar antenna is almost a same size as a size of the concave of the electrically conductive housing.

* * * * *